(12) United States Patent
Nunokawa

(10) Patent No.: US 6,837,559 B2
(45) Date of Patent: Jan. 4, 2005

(54) PRINTING APPARATUS, PRINTING MEDIUM, MEMORY, COMPUTER-READABLE MEDIUM, PRINTING SYSTEM, AND PRINTING METHOD

(75) Inventor: Hirokazu Nunokawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 2 days.

(21) Appl. No.: 10/353,065

(22) Filed: Jan. 29, 2003

(65) Prior Publication Data

US 2004/0080551 A1 Apr. 29, 2004

(30) Foreign Application Priority Data

Feb. 4, 2002 (JP) .......................................... 2002-027114

(51) Int. Cl.[7] .............................. B41J 29/38; B41J 2/15
(52) U.S. Cl. ............................................. 347/5; 347/41
(58) Field of Search .............................. 347/5, 14, 41, 347/105, 106

(56) References Cited

U.S. PATENT DOCUMENTS

| | | | | |
|---|---|---|---|---|
| 5,745,145 A | * | 4/1998 | Hirabayashi et al. | ....... 347/183 |
| 6,375,298 B2 | * | 4/2002 | Purcell et al. | ................ 347/14 |
| 6,717,507 B1 | * | 4/2004 | Bayley et al. | ............... 340/5.1 |
| 2002/0118243 A1 | * | 8/2002 | Forman | ...................... 347/19 |
| 2004/0114023 A1 | * | 6/2004 | Jacobsen et al. | ............ 347/106 |

* cited by examiner

*Primary Examiner*—Stephen D. Meier
*Assistant Examiner*—Alfred Dudding
(74) *Attorney, Agent, or Firm*—Sughrue Mion, PLLC

(57) ABSTRACT

A printing apparatus and the like that enable printing according to an interlace mode that matches the characteristics of a printing medium set to the printing apparatus are realized. A printing apparatus for printing an image on a printing medium comprises: a print head capable of performing scanning in a predetermined direction and ejecting ink, the print head ejecting ink onto a printing medium comprising a memory, wherein the memory stores print control information for determining a number of times of scans for which the print head performs scanning when image data for one line is to be printed, and the print head performs scanning according to the number of times of scans that has been determined based on the print control information.

24 Claims, 10 Drawing Sheets

| TYPE OF PAPER | | NUMBER OF TIMES OF SCANS | TIMING AT WHICH INK IS ALLOWED TO EJECT DURING EACH SCAN |
|---|---|---|---|
| NOT CAUSING BLOTS EASILY ⟵⟶ CAUSES BLOTS EASILY | a | ONCE | 111111111111......111111 |
| | b | TWICE | 101010101010......101010<br>010101010101......010101 |
| | c | TWICE | 110011001100......110011<br>001100110011......001100 |
| | d | FOUR TIMES | 100010001000......100010<br>001000100010......001000<br>010001000100......010001<br>000100010001......000100 |
| | e | EIGHT TIMES | 100000001000......100000<br>000000100000......000010<br>001000000010......001000<br>000000010000......000000<br>010000000100......010000<br>000001000000......000001<br>000100000001......000100<br>000000010000......000000 |

FIG. 9

PRINTING APPARATUS, PRINTING MEDIUM, MEMORY, COMPUTER-READABLE MEDIUM, PRINTING SYSTEM, AND PRINTING METHOD

CROSS-REFERENCE TO RELATED APPLICATIONS

The present application claims priority upon Japanese Patent Application No. 2002-027114 filed Feb. 4, 2002, which is herein incorporated by reference.

BACKGROUND OF THE INVENTION

1. Field of the Invention

The present invention relates to a printing apparatus, a printing medium, a memory, a computer-readable medium, a printing system, and a printing method.

2. Description of the Related Art

In recent years, a need has arisen for printed matter, which is printed by printing apparatuses such as inkjet printers, to possess not only a simple quality for printing letters and/or line drawings, but also to possess higher image quality that is on par with silver halide photographs. Therefore, in order to reduce blotting, which becomes the cause deterioration in image quality, printing is controlled in accordance with qualities of paper to be the printing medium, such as absorbability.

For example, in case of performing printing where high image quality is desired, printing is carried out according to a so-called interlace mode. In interlace-mode printing, high image quality printing is realized by distributing variations in ejection characteristics of the nozzles and/or nozzle pitches and making the variations not stand out. This printing mode is also applied in situations where there is a possibility that blotting may occur if adjacent dots are continuously printed because the paper has low absorbability and the ink is hard to dry. This is a printing mode in which, for example: upon printing image data for one line in the main-scanning direction, which is the direction in which the print head performs scanning, the print head performs scanning several times, wherein each scan, the dots are printed with intervals therebetween; and the intervals between the dots are successively printed as the scanning is repeated. In order to carry out such printing, a rasterizing process for sorting the print data is necessary.

However, as for paper that serves as the printing medium, there are various types of paper having different characteristics, and there are various types of interlace modes that are to be set as the printing mode. Therefore, in order to obtain an image having a satisfactory image quality, printing has to be carried out with an interlace mode that suits each type of paper. It would be burdensome for the user to set the printing mode to an interlace mode suiting the paper that is set to the printing apparatus every time printing is carried out.

Further, the current demand for high quality images is extremely keen, and consideration is being made to reduce, as much as possible, occurrence of blotting. However, even if the paper is produced according to the same specifications, there is a possibility that the characteristics of the paper may differ due to differences in environment at the time of production and differences in production lots. Thus, even when printing is carried out on paper that originally is blot resistant according to an interlace mode suiting this paper, there is a problem that in some situations, blotting occurs and a satisfactory image cannot be obtained.

SUMMARY OF THE INVENTION

The present invention has been made in view of such problems, and an object thereof is to realize a printing apparatus, a printing medium, a memory, a computer-readable medium, a printing system, and a printing method, which enable printing with an interlace mode that matches the characteristics of a printing medium that is set to the printing apparatus.

A main invention is a printing apparatus as follows.

A printing apparatus for printing an image on a printing medium comprises:

a print head capable of performing scanning in a predetermined direction and ejecting ink, the print head ejecting ink onto a printing medium comprising a memory, wherein the memory stores print control information for determining a number of times of scans for which the print head performs scanning when image data for one line is to be printed, and the print head performs scanning according to the number of times of scans that has been determined based on the print control information.

Features of the present invention other than the above are made clear through the description below and the accompanying drawings.

BRIEF DESCRIPTION OF THE DRAWINGS

For more complete understanding of the present invention and the advantages thereof, reference is now made to the following description taken in conjunction with the accompanying drawings.

FIG. 9 is a diagram for explaining a paper-type/control correspondence data table of the present embodiment by which the types of paper, the number of times of scans for which the print heads perform scanning when image data for one line is to be printed, and data indicative of the timing at which the ink is allowed to eject for every scan are associated with each other.

DETAILED DESCRIPTION OF THE PREFERRED EMBODIMENTS

Figure 1:
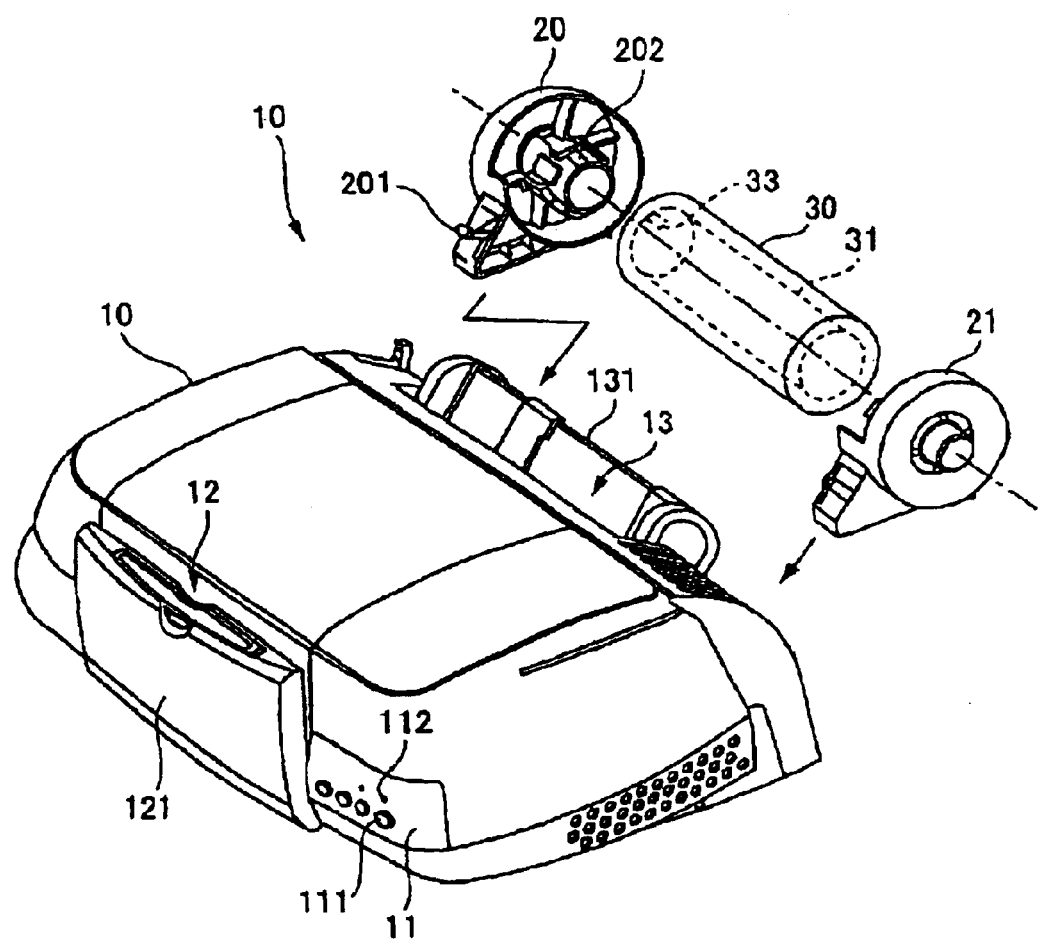
FIG. 1 is a diagram showing a schematic configuration of a color printer 10 according to the present embodiment.

At least the following matters will be made clear by the description in the present specification and the accompanying drawings.

A printing apparatus for printing an image on a printing medium comprises:

a print head capable of performing scanning in a predetermined direction and ejecting ink, the print head ejecting ink onto a printing medium comprising a memory, wherein the memory stores print control information for determining a number of times of scans for which the print head performs scanning when image data for one line is to be printed, and the print head performs scanning according to the number of times of scans that has been determined based on the print control information.

According to such a printing apparatus, with the print control information stored on the memory provided in/on the printing medium, it becomes possible to set the number of times of scans for which the print head performs scanning when image data for one line is to be printed to a number of times suiting the printing medium. Therefore, it becomes possible to print satisfactory images without making a user set the above-mentioned number of times of scans for the printing medium that is set to the printing apparatus.

The printing medium may have a storage element as the memory.

According to such a printing apparatus, it becomes possible to print satisfactory images by reflecting the print control information stored on the storage element when printing on the printing medium, just by providing a storage element in/on the printing medium.

Further, the printing medium may have a mark as the memory.

According to such a printing apparatus, it becomes possible to store the print control information on the printing medium just by providing a mark on the printing medium and reflect the print control information on the prints.

Further, it is preferable that the print control information is information for identifying a characteristic of the printing medium, and the number of times of scans is determined based on this information.

According to such a printing apparatus, it becomes possible to print by scanning the print head for a number of times of scans that matches the characteristics of the printing medium when image data for one line is to be printed, and it becomes possible to obtain satisfactory images.

Further, the characteristic of the printing medium may be the type of paper, and the number of times of scans may be determined based on the type of paper.

According to such a printing apparatus, it becomes possible to print by scanning the print head for a number of times of scans that matches the type of paper when image data for one line is to be printed, and it becomes possible to obtain satisfactory images.

Further, the print control information may be the number of times of scans for which the print head performs scanning when image data for one line is to be printed, and the print head may perform scanning according to the number of times of scans.

According to such a printing apparatus, the number of times of scans for which the print head performs scanning when image data for one line is to be printed will specifically be set for the printing medium, and it becomes possible to obtain satisfactory images by scanning the print head for this number of times of scans.

Further, it is preferable that the print control information is information indicative of a timing at which the print head is allowed to eject ink for each scan.

According to such a printing apparatus, it becomes possible to cause ink to eject at appropriate positions during each scan so that satisfactory images can be obtained using the printing medium.

Further, a printing medium on which an image is printed by a printing apparatus in which a print head capable of ejecting ink scans in a predetermined direction comprises:

a memory capable of storing information, wherein the memory stores print control information for determining a number of times of scans for which the print head performs scanning when image data for one line is to be printed.

According to such a printing medium, since the printing medium comprises the print control information, by reading in the information, it becomes possible for a user to print without setting the number of times of scans for which the print head performs scanning when image data for one line is to be printed.

Further, the printing medium may have a storage element as the memory.

According to such a printing medium, by storing the print control information on the storage element, it becomes possible to provide the printing medium with information about the number of times of scans for which the print head performs scanning when image data for one line is to be printed.

Further, the printing medium may have a mark as the memory.

According to such a printing medium, by storing the print control information on the mark, it becomes possible to easily and inexpensively provide the printing medium with information about the number of times of scans for which the print head performs scanning when image data for one line is to be printed.

Further, it is preferable that the print control information is information for identifying a characteristic of the printing medium.

According to such a printing medium, it becomes possible to provide a user with print control information corresponding to the characteristics of the printing medium by providing it on the printing medium.

Further, it is preferable that the information for identifying a characteristic of the printing medium is the type of paper.

According to such a printing medium, it becomes possible to provide a user with print control information corresponding to the type of paper by providing it on the printing medium.

Further, the print control information may be the number of times of scans for which the print head performs scanning when image data for one line is to be printed.

According to such a printing medium, the number of times of scans for which the print head performs scanning when image data for one line is to be printed will specifically be set for the printing medium, and it becomes possible to print according to this number of times of scans.

Further, it is preferable that the print control information is information indicative of a timing at which the print head is allowed to eject ink for each scan.

According to such a printing medium, it becomes possible to cause ink to eject at appropriate positions during each scan for printing onto the printing medium.

Further, a memory provided in or on a printing medium that is used in a printing apparatus in which a print head performs scanning in a predetermined direction to print an image comprises:

print control information for determining a number of times of scans for which the print head performs scanning to print image data for one line.

According to such a memory, it becomes possible to provide a user with print control information for determining the number of times of scans for which the print head performs scanning when image data for one line is to be printed along with the printing medium.

Further, the memory may be a storage element.

According to such a memory it becomes possible to provide a user with the print control information by providing it on the storage element.

Further, it is preferable that the print control information is information for identifying a characteristic of the printing medium.

According to such a storage element, it becomes possible to provide a user with a printing medium that is provided with print control information corresponding to the characteristics of the printing medium.

Further, it is preferable that the information for identifying a characteristic of the printing medium is the type of paper.

According to such a storage element, it becomes possible to provide a user with paper by provided it with print control information corresponding to the type of paper.

Further, it is preferable that the print control information is the number of times of scans for which the print head performs scanning to print image data for one line.

According to such a storage element, it becomes possible to provide a user with a printing medium on which the number of times of scans for which the print head performs scanning when image data for one line is to be printed is stored.

Further, it is preferable that the print control information is information indicative of a timing at which the print head is allowed to eject ink for each scan.

According to such a storage element, it becomes possible to cause ink to eject at appropriate positions during each scan for printing onto the printing medium provided with the storage element.

Further, a computer-readable medium for causing a printing apparatus, which is capable of printing an image on a printing medium comprising a memory by causing a print head capable of ejecting ink to perform scanning in a predetermined direction, to operate comprises the following code:

a code for causing the print head to perform scanning according to a number of times of scans determined based on print control information, wherein the print control information is stored on the memory and is information for determining the number of times of scans for which the print head performs scanning when image data for one line is to be printed.

Further, a printing system comprising (a) a computer, and (b) a printing apparatus capable of being connected to the computer and for printing an image on a printing medium comprises:

a print head capable of performing scanning in a predetermined direction and ejecting ink, the print head ejecting ink onto a printing medium comprising a memory, wherein the memory stores print control information for determining a number of times of scans for which the print head performs scanning when image data for one line is to be printed, and the print head performs scanning according to the number of times of scans that has been determined based on the print control information.

Further, a printing method for printing an image on a printing medium comprising a memory by causing a print head capable of ejecting ink to perform scanning in a predetermined direction comprises the steps of:

reading out print control information that is stored on the memory and that is for determining a number of times of scans for which the print head performs scanning when image data for one line is to be printed, and causing the print head to perform scanning according to the number of times of scans determined based on the print control information that has been read out.

Further, a printing apparatus for printing an image on a printing medium comprises:

a print head capable of performing scanning in a predetermined direction and ejecting ink, the print head ejecting ink onto a printing medium comprising storage means, wherein the storage means stores print control information for determining a number of times of scans for which the print head performs scanning when image data for one line is to be printed, and the print head performs scanning according to the number of times of scans that has been determined based on the print control information.

Overview of the Configuration of the Printing Apparatus

Next, explanation will be made of an outline of an ink-jet printer serving as a printing apparatus to which the present invention is mainly applicable. FIG. 1 is a diagram showing a schematic external view of an inkjet printer.

Here, a color inkjet printer is shown. Note that the color printer 10 comprises a roll paper unit 30 removably mounted to the color printer 10.

The color printer 10 is a printer capable of outputting color images, and is an inkjet-type printer that forms images by ejecting color inks of four colors, for example, cyan (C), magenta (M), yellow (Y), and black (K) on a printing medium such as roll paper and forming dots therewith. Note that, as color ink, in addition to the above four colors, light cyan (pale cyan, LC), light magenta (pale magenta, LM), dark yellow (dim yellow, DY) may be used.

As shown in FIG. 1, the color printer 10 has a structure for discharging a printing medium such as a printing paper, which has been supplied from the back of the printer, from the front side thereof. An operation panel 11 and a paper discharge section 12 are provided on the front side of the color printer 10; a paper supply section 13 is provided on the back. The operation panel 11 has various operation buttons 111 and display lamps 112. The paper discharge section 12 has a paper discharge tray 121 which covers the paper discharge opening when it is not in use. The paper supply section 13 has a paper supply holder 131 for holding cut paper (not shown), and roll-paper-unit holders 20, 21 for holding the roll paper unit 30. Note that cut paper is paper that is cut into a predetermined size in advance and is a single-sheet printing medium that will not be cut by the color printer 10.

Internal Configuration of the Color Printer 10

Next, with reference to FIG. 2 and FIG. 3, explanation will be made of an internal structure of a color printer 10.

Figure 2:
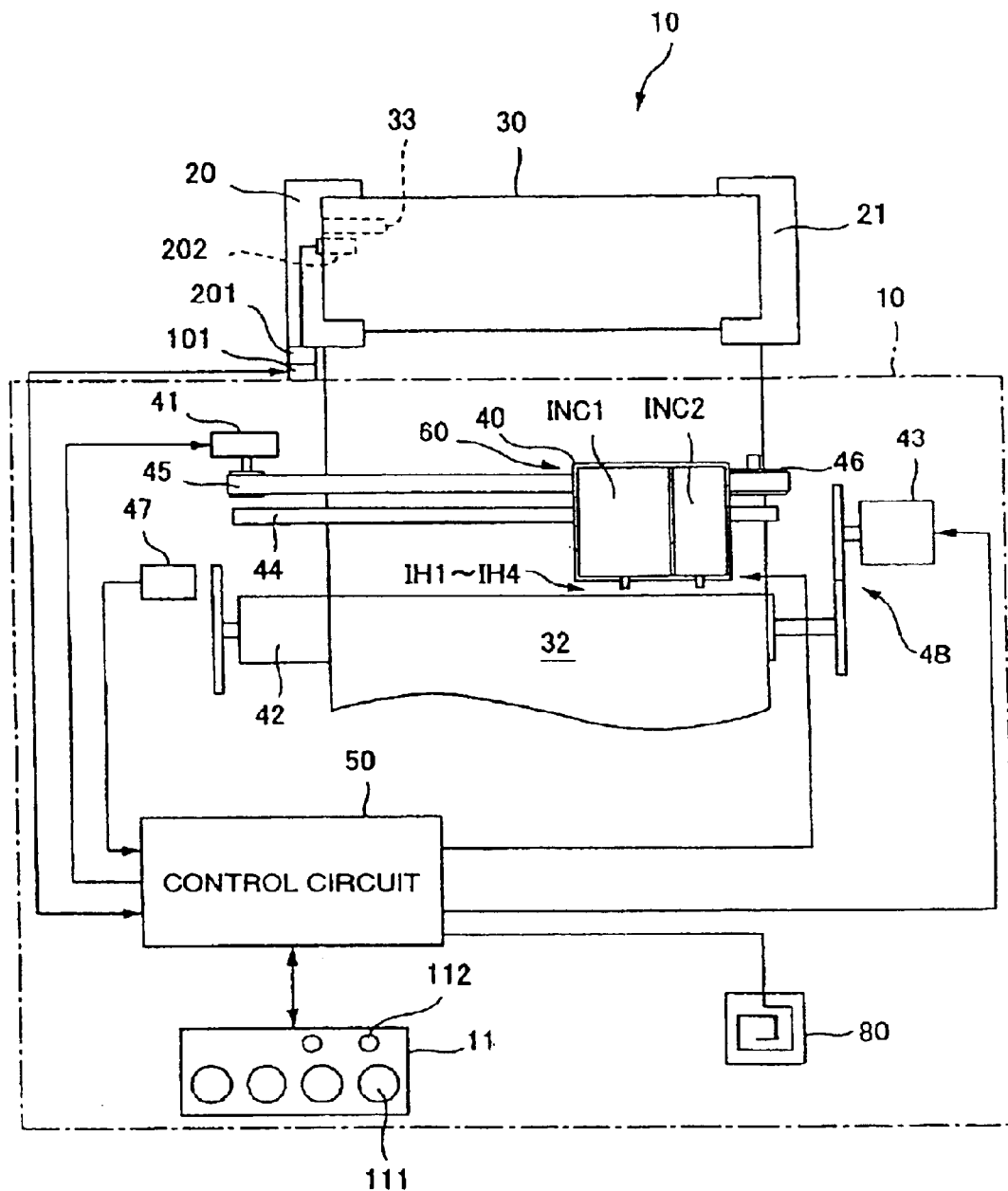
FIG. 2 is a diagram showing an internal configuration of the color printer 10 according to the present embodiment.
Figure 3:
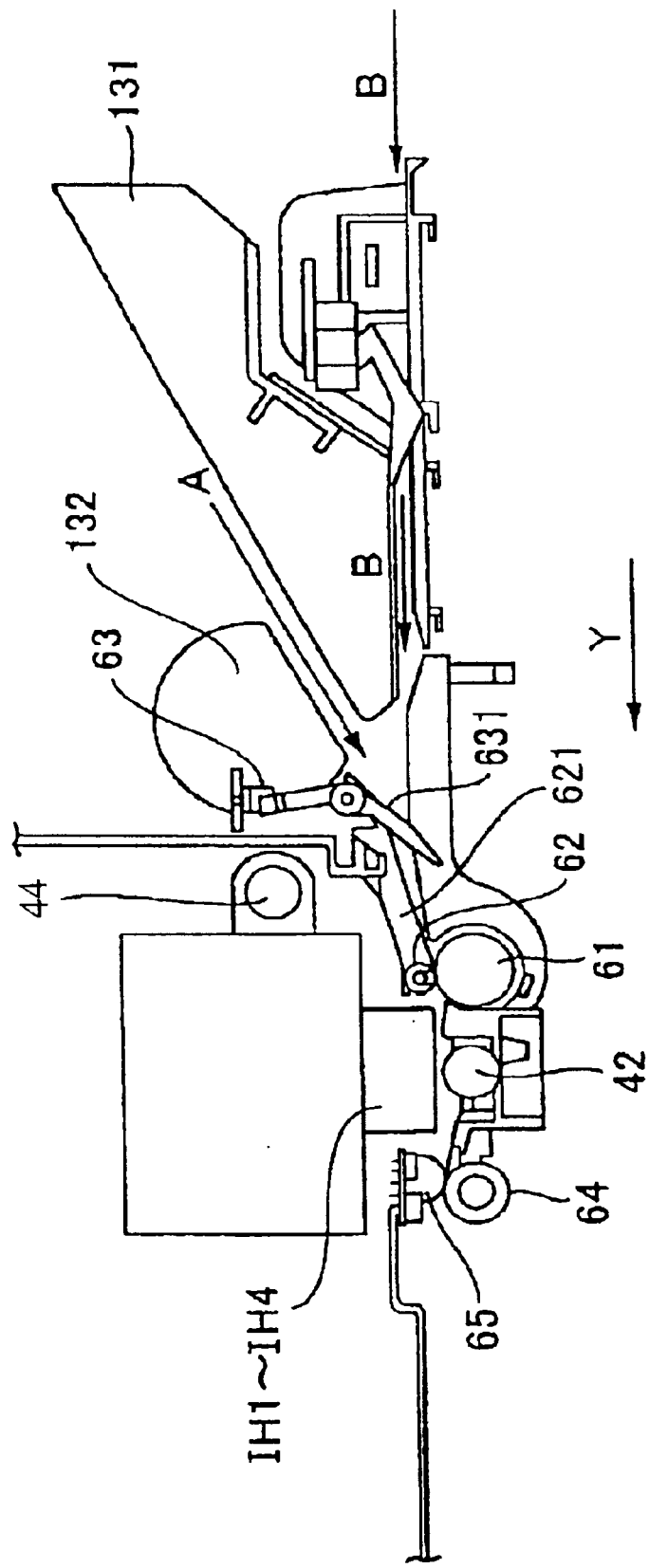
FIG. 3 is a section view of main components of the color printer 10, showing paper supply passages.

FIG. 2 is a diagram showing an internal structure of a color printer 10 according to this embodiment. FIG. 3 is a section view showing main parts of the color printer 10 for explaining the paper supply mechanism.

As shown in the figure, the color printer 10 has: a mechanism 60 for driving print heads IH1 through IH4 mounted on a carriage 40 to eject ink and form dots; a mechanism for moving, with a carriage motor 41, the carriage 40 back and forth in an axial direction of a platen 42; a mechanism for transporting cut paper 133 supplied from the paper supply unit 131, printing media supplied from a paper supply passage shown with the arrow B, and print roll paper 32 supplied from the roll paper unit 30 with a paper-feed motor 43; and a control circuit 50.

The mechanism for moving the carriage 40 back and forth in the axial direction of the platen 42 is structured of, for example: a slide shaft 44 slidably holding the carriage 40 and provided in parallel to the axis of the platen 42; and a pulley 46 with an endless drive belt 45 provided stretched in between the carriage motor 41 and itself.

The mechanism for transporting the printing medium and the roll paper includes: the platen 42; the paper-feed motor 43 for rotating the platen 42; a transport drive roller 61; a transport driven roller 62; a gear mechanism 48 for transmitting rotation of the paper-feed motor 43 to the platen 42 and the two rollers 61, 62 mentioned above; an encoder 47 for detecting an angle of rotation of the platen 42; and a paper detector 63. Further, there is a read sensor 80 provided near the paper detector 63. Further, opposing the contact point 201 provided on the roll-paper-unit holder 20 is a contact point 101 provided on the body of the printer 10.

When print instructing signals are input from the operation panel 11 of the printer and/or a personal computer PC connected to the printer, the control circuit 50 appropriately controls the movement of the paper-feed motor 43, the carriage motor 41, and the print heads IH1 through IH4. The print roll paper 32 of the roll paper unit 30, which is held by the roll-paper-unit holders 20, 21 of the color printer 10, and the printing medium, which is supplied from the paper supply unit 131 and/or the straight-path paper supply passage shown with the arrow B, are guided so as to be sandwiched between the transport drive roller 61 and the transport driven roller 62 and are transported a predetermined amount according to the angle of rotation of the platen 42.

Configuration Around the Cartridge

Next, explanation will be made of the structure of the carriage 40 inside the inkjet printer 10 and the periphery of the carriage.

As shown in FIG. 2, the carriage 40 is connected to the carriage motor 41 by the drive belt 45 via the pulley 46 and is driven so as to move parallel to the platen 42 being guided by the slide shaft 44. On the surface of the carriage 40 that opposes the print paper are provided the heads IH1 through IH4 which comprise a row of nozzles ejecting black ink and rows of nozzles ejecting color ink. Ink is supplied to each of the nozzles from ink cartridges INC1, INC2, and the nozzles eject ink drops onto the printing medium to print characters and images.

To the carriage 40 are mounted the ink cartridge INC1 and the ink cartridge INC2 as ink units. Each of the ink cartridges INC1 and INC2 comprises a storage element ME (FIG. 4) which stores, for example, the remaining amount of ink. The ink cartridge INC1 contains black (K) ink, and the ink cartridge INC2 contains other ink, that is, the inks in three colors of cyan (C), magenta (M), and yellow (Y). Inks of light cyan (LC), light magenta (LM), dark yellow (DY) may also be contained as already mentioned.

Configuration of the Paper Supply Mechanism

The color printer 10 of the present embodiment is configured to comprise a paper supply passage particularly called a straight path (which is not shown in FIG. 1). This is a paper supply mechanism for manually supplying printing media having a certain thickness and/or stiffness, such as cardboard. The straight path mechanism allows to print on a printing medium having irregular size and/or shape, such as a CD-R, by supplying the medium on a printing medium transport tray (not shown), without breaking the printing medium. FIG. 3 is a section view showing main portions of the printer 10 for explaining these two paper supply mechanisms.

The paper supply tray 131 is a configuration capable of supplying printing media in the form of cut paper, such as plain paper and photo paper, and comprises an ASF (automatic sheet feeder) for automatically supplying the printing media. The ASF is an automatic paper supplying mechanism comprising the paper supply roller 132 provided on the paper supply tray 131 and separation pads that are not shown. The paper supply roller 132 has a substantially D-shaped transverse cross sectional shape and is rotated and controlled by the rotational driving force of a stepping motor or the like. Through the rotational driving force of the paper supply roller 132 and the frictional resistance of the separation pads, a situation in which several printing media are supplied at once is prevented.

The printing medium having been automatically supplied by the ASF along the passage shown with the arrow A is intermittently transported a predetermined paper-feed amount towards a print-execute area with means for transporting and positioning the printing medium that is arranged downstream of the paper supply roller 132 in the sub-scanning direction Y.

The transport drive roller 61 and the transport driven roller 62 are provided as the transporting and positioning means, which intermittently transports the printing medium in the sub-scanning direction Y and positions it. The transport drive roller 61 is rotated and controlled by a paper feed motor, such as a stepping motor, and the printing medium is transported in the sub-scanning direction Y through the rotation of the transport drive roller 61. The transport driven roller 62 is supported by a plurality of transport-drive-roller holders 621. As the printing medium is transported due to the rotation of the transport drive roller 61, the transport driven roller 62 follows this movement and rotates.

Further, between the paper supply roller 132 and the transport drive roller 61 is arranged a paper detector 63 according to a known technology in conventional art. The paper detector 63 has a lever 631 that is given a self-righting characteristic to return to its upright position and is pivotally supported in a state such that it can move circularly only in the direction in which the recording paper is transported and protrudes into the transporting passage of the printing medium. The configuration is such that, as the tip end of the lever 631 is pressed against the printing medium, the lever 631 moves circularly, and the printing medium is thereby detected. The paper detector 63 detects the beginning position and the end position of the printing medium that has been supplied by the paper supply roller 132. According to the detected positions, the printing area is determined and printing is performed.

On the other hand, a paper discharge drive roller 64 and paper discharge driven rollers 65 are provided as means for discharging the printing medium that has been printed. The paper discharge drive roller 64 is rotated and controlled by the rotational driving force of, for example, the stepping motor, and the printing medium is discharged in the sub-scanning direction Y through the rotation of the paper discharge drive roller 64. The paper discharge driven rollers 65 are teethed rollers, each of which having a plurality of teeth on its circumference and in which the tip end of each tooth is acutely sharpened so that it makes a point contact with the recording surface of the printing medium. When the printing medium is discharged due to the rotation of the paper discharge drive roller 64, each of the driven rollers follows this movement and rotates.

Further, the printer 10 comprises a paper supply path for supplying printing medium having small flexibility, such as cardboard in which a storage element as a memory is embedded, other than the paper supply passage by the ASF explained above (the passage indicated by the arrow with the character A). In the figure, this paper supply path is shown by the arrow with the character B. The printer 10 can perform printing on the printing medium supplied from the paper supply path shown with the arrow B in the same manner as that for the printing medium supplied from the above-mentioned ASF.

Further, the printer 10 comprises a transport-driven-roller releasing mechanism, although it is not shown in the figure. This mechanism keeps the transport driven roller 62 in a state (released state) separated from the transport drive roller 61 while the printing medium is being set in its set position, and after the printing medium has been inserted into the paper supply path to be set in its print-set position and the positioning of the printing medium to its print-set position has completed, this mechanism cancels the released state, whereby the transport driven roller 62 returns to a state in which it is urged by the transport drive roller 61. Here, when the printing medium is set to its print-set position, the operation will be in a stopped state; making use of this halt state, as for a printing medium having a storage element, information is read from the storage element.

Although not shown in the figure, a reading sensor, as reading means for reading information from the storage element of the printing medium, is provided above the vicinity of the point where the paper supply path shown with the arrow B and the paper supply path shown with the arrow A join, that is, the vicinity of the paper detector 63. The reading sensor is arranged in a position where it exactly opposes the storage element when the printing medium is positioned in the halt state. The details on the structure and the arrangement of the reading sensor will be explained later.

Note that the paper supply mechanism (transporting means) for transporting the printing medium to the passage shown by the arrow with the character B carries the printing medium that has been set in a horizontal state while keeping the medium in the horizontal state. Therefore, it becomes possible to effectively read-in the information stored on the element provided on the printing medium, even if, for example, the stiffness of the printing medium is high.

Internal Structure of the Control Circuit 50

Figure 4:
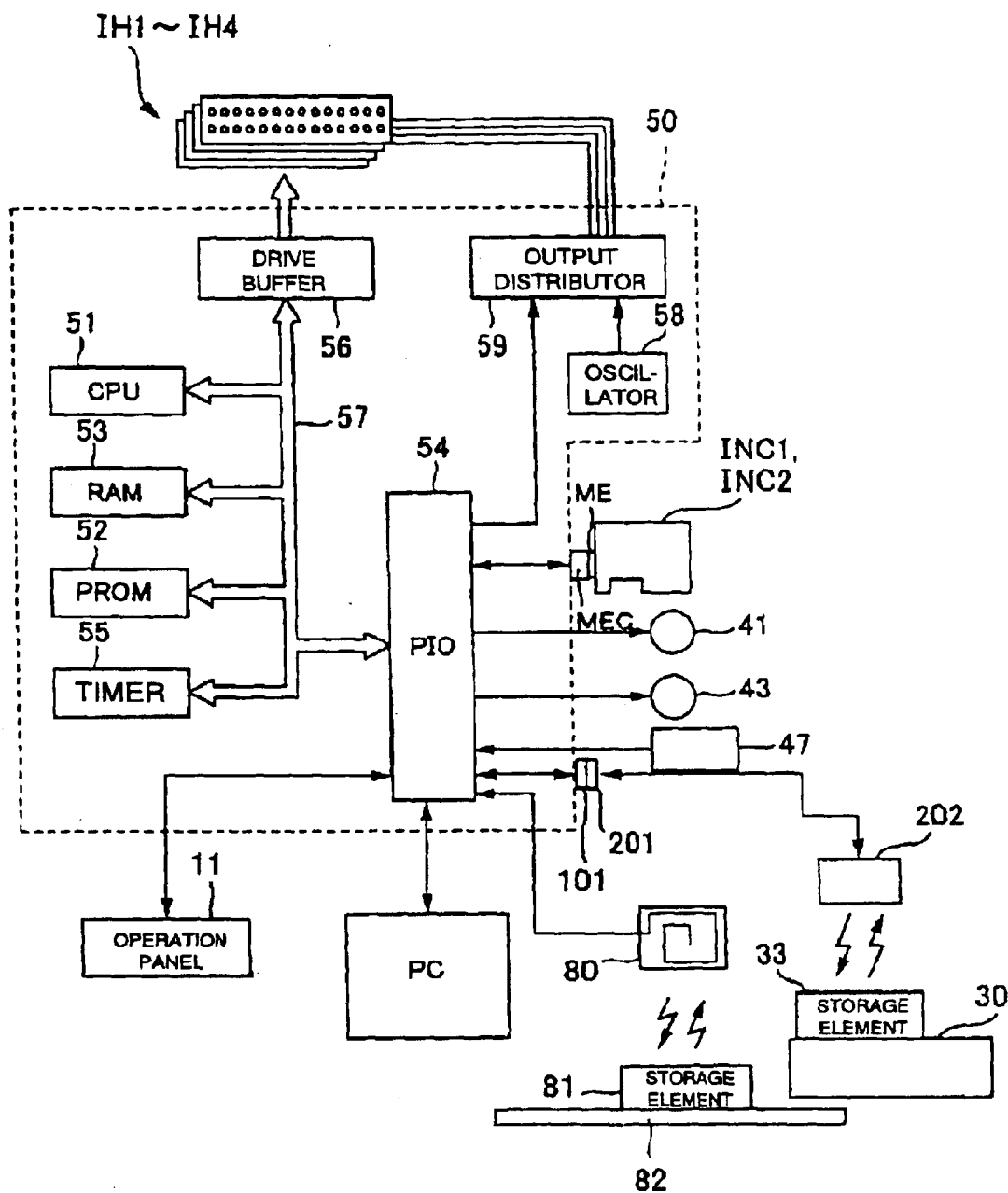
FIG. 4 is a block diagram showing an internal configuration of a control circuit 50 of the color printer according to the present embodiment.

Next, the internal configuration of the control circuit 50 of the color printer 10 is described with reference to FIG. 4. FIG. 4 is a block diagram showing the internal configuration of the control circuit 50 of the color printer 10 according to the present embodiment.

As shown in the figure, a CPU 51, a PROM 52, a RAM 53, a periphery device input/output section (PIO) 54, a timer 55, and a drive buffer 56, for example, are provided inside the control circuit 50.

The PIO 54 is connected to the operation panel 11, a personal computer PC, a contact MEC connecting it with the storage elements ME of the ink cartridges, the carriage motor 41, the paper-feed motor 43, the encoder 47, and a transmit/receive section 202 via the contacts 101 and 201. The drive buffer 56 is used as a buffer for supplying on/off signals for dot formation to the print heads IH1 to IH4. These are connected to one another by a bus 57 and can exchange data among one another.

The control circuit 50 is also provided with an oscillator 58 for outputting a drive waveform at a predetermined frequency, and an output distributor 59 for distributing the output from the oscillator 58 to the print heads IH1 to IH4 at a predetermined timing.

The control circuit 50 reads information from the storage element 33 that is provided in a core material 31 of the roll paper unit 30 via the transmit/receive section 202 when, for example, the power is turned on, the roll paper unit 30 is exchanged, and the power is turned off, and also from the storage element 81 of the printing medium 82 via the reading sensor 80 when the printing medium 82 is made to halt in its print-set position. Then, the control circuit 50 controls the printing processes in response to the information having been obtained. During printing, the control circuit outputs dot data to the drive buffer 56 at a predetermined timing while synchronizing with the movement of the carriage motor 41 and the paper-feed motor 43. Details on the reading processes in view of the storage elements 33, 81 and on the printing processes in which the information obtained from the storage elements 33, 81 is used are described later.

Configuration of the Printing Medium

Figure 5:
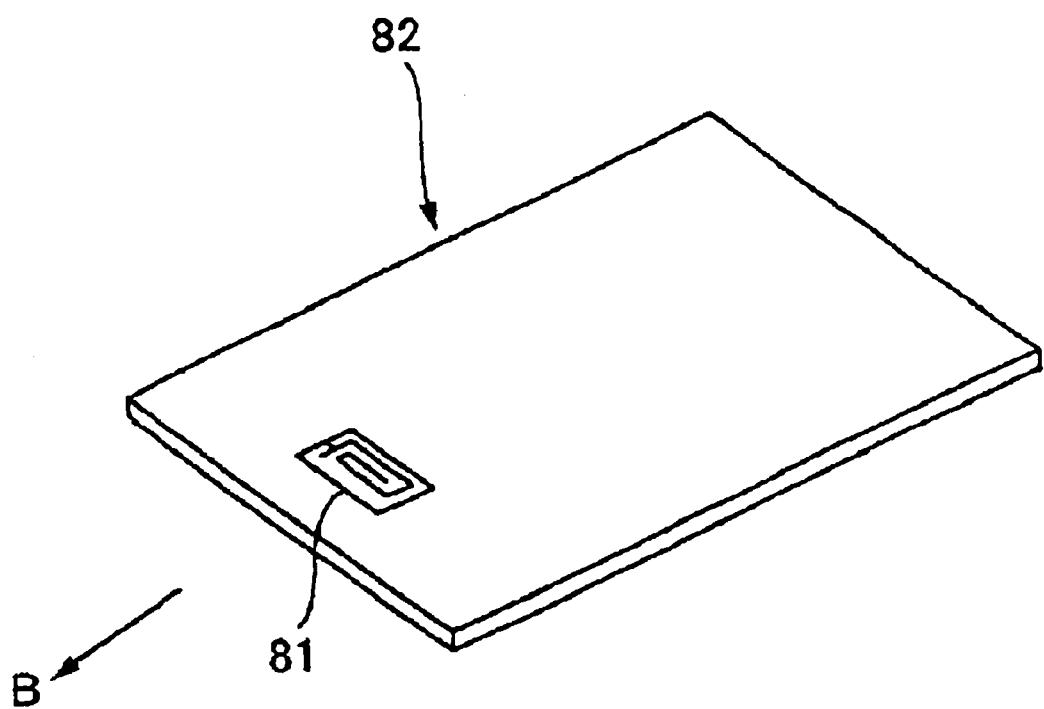
FIG. 5 is a perspective view of a cardboard in which a storage element 81 is embedded into a cardboard 82 which serves as the printing medium.

FIG. 5 is a perspective view of a printing medium in the present embodiment. The body of this printing medium 82 is cardboard, and, taking the arrow B as the paper supply direction, near the leading end of the body, a storage element 81 is embedded and made into a unit. As explained above, the storage element 81 is located so that the storage element 81 and the reading sensor 80 (FIG. 6B) exactly oppose each other when the printing medium is positioned in the halt state while being transported along the paper supply path in the Y direction. The position at which the storage element 81 is embedded depends on the position where the reading sensor 80 is arranged. However, if the element is located closer to the rear end of the cardboard, it becomes necessary to move the printing medium 82 back again to the above-mentioned set position after the element is read by the reading sensor 80; therefore, it is preferable to place it in the vicinity of the leading end.

The storage element 81 is an element having a memory cell, such as an NAND flash ROM and is extremely small and thin, structured from an IC chip having a coil serving as an antenna, a controller, and a memory section. The element can easily be embedded in, for example, cardboards having a thickness of approximately 0.5 mm. Further, this storage element 81 is of a type that is readable in a noncontact state. Therefore, the reading sensor 80 and the storage element 81 do not have to contact with each other, and there is a gap therebetween. The storage element 81 rectifies the carrier wave transmitted from the reading sensor 80 to generate necessary electric power. Note that, if the reading sensor 80 is transmit/receive means that can not only read information but can also write information, then it is possible to write in various information from the printing apparatus 10 to the storage element 81.

Configuration of the Storage Element and the Reading Sensor

Figure 6A:
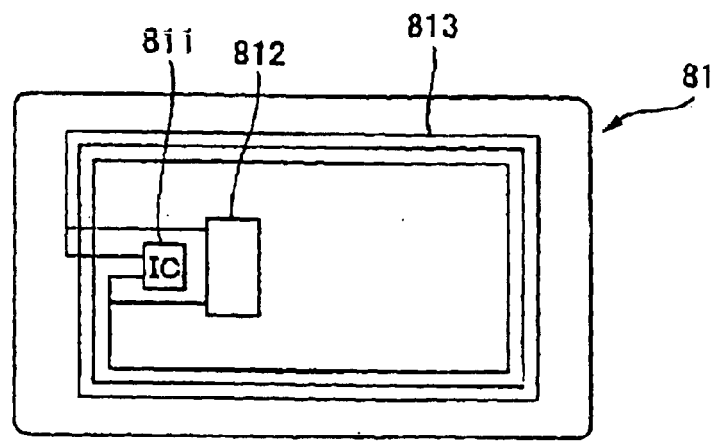
FIG. 6A is a plan transparent view showing the configuration of the storage element 81.

Next, explanation will be made of the configuration of the storage element 81, as a memory, and the reading sensor 80 with reference to FIG. 6A and FIG. 6B. FIG. 6A is a plan transparent view showing the configuration of the storage element 81. The storage element 81 is a noncontact-type proximity storage element, the distance in which data is transmittable/receivable to/from the reading sensor 80 being about 20 cm. The element is extremely small and thin an a whole, and it is possible to make one side thereof sticky so as to allow the element to adhere to an object as a sticker. This is called, for example, a memory tag, and various types are commercially available.

As for the storage element 81, a noncontact IC chip 811, and a resonant capacitor 812 and a flat coil 813, which are formed by etching on a metal film, are mounted on a plastic film, and the element is covered with a transparent cover sheet. On the other hand, although not shown in the plan view etc., the reading sensor is configured of a coil antenna 801, alike the storage element, and a transmit/receive circuit 802, and electric power is supplied from the power source unit of the main printer unit 10.

Figure 6B:
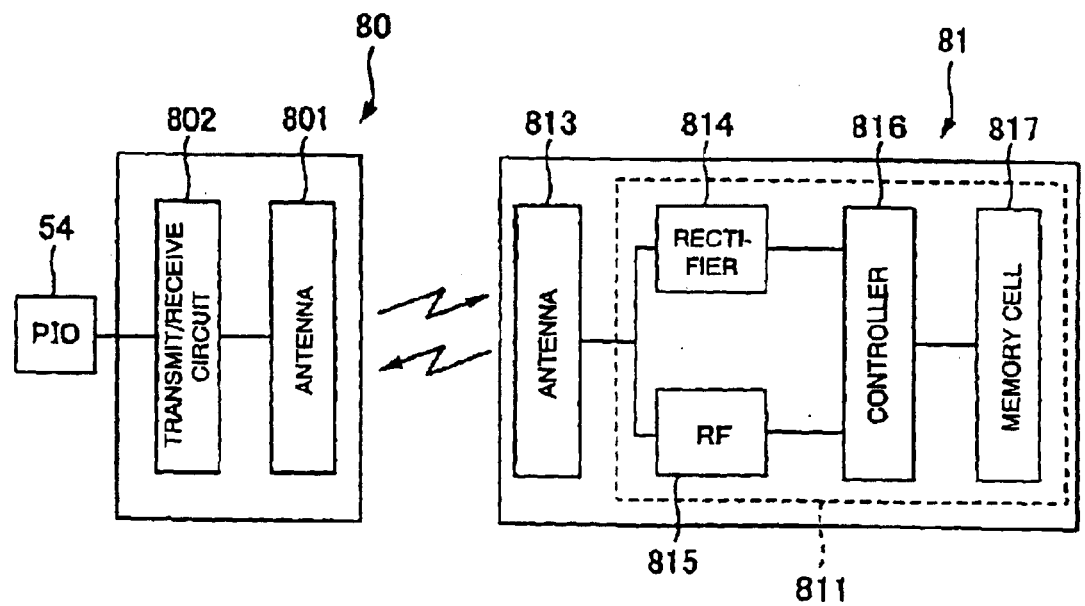
FIG. 6B is a block diagram showing the internal configuration of the storage element 81 and the reading sensor.

FIG. 6B is a block diagram showing the internal configuration of the storage element 81 and the reading sensor 80. The reading sensor 80 is configured of an antenna coil 801 and a transmit/receive circuit 802 that is connected to a later-described periphery device input/output section (PIO) 54 (FIG. 3) of the control circuit of the main printer unit. The IC chip 811 of the storage element 81 is configured of a rectifier 814, an RF (Radio Frequency) signal analyzer 815, a controller 816, and a memory cell 817. The memory cell 817 is an electrically readable/writable memory, such as an NAND flash ROM.

The antenna 813 of the storage element 81 and the antenna 801 of the reading sensor 80 communicate with each other to, for example, read information stored on the memory cell 817. Further, the high frequency signal generated by the transmit/receive circuit 802 of the reading sensor 80 is induced as a high frequency magnetic field via the antenna 801. This high frequency magnetic field is taken in via the antenna 813 of the storage element 81, rectified by the rectifier 814, and becomes a direct-current power source for driving each of the circuits in the IC chip 811.

On the memory cell 817 of the storage element 81 is stored print control information for determining the number of scan times for which the print heads perform scanning when image data for one line is to be printed using the printing medium 82 on which this storage element is provided. The print control information is, for example, information about the type of material of the printing medium (such as paper, plastic, hide, or an OHP sheet), and information about the paper type, such as plain paper or photo paper. The information stored on the storage element can be written in when the element is manufactured in a factory or during a process in which the element is embedded into the paper. Further, other than the above, for example, the thickness of the printing medium, the width of the printing medium, the date of manufacture of the printing medium, and the LUT of the printing medium may be stored on the storage element as 8-bit information for every address.

Arrangement of the Reading Sensor

In the present embodiment, the reading sensor 80 is to be to be arranged above the vicinity of the point where the paper supply path shown with the arrow A and the paper supply path shown with the arrow B join, that is, above the vicinity of the paper detector 63, but it is not limited to the above. However, it is preferable that the sensor is arranged upstream of paper supply from the transporting and positioning means (the transport drive roller 61 and the transport driven roller 62), which transports the printing medium 82 towards the print heads IH1 through IH4 provided downstream. This is because, since the information of the printer 10 at a early state upon printing, it is possible to precisely carry out the setting of print control.

Note that the configuration may be that the reading sensor 80 is provided, for example, on the bottom surface of any one of the print heads IH1 through IH4 and can be moved along with the print heads IH1 through IH4. According to such a configuration, it becomes possible to surely read data by moving the print heads IH1 through IH4 in the scanning direction to an appropriate position for reading, regardless of the width of the printing medium 82.

In any of the above cases, it is needless to say that it is preferable to arrange the sensor at a position where it is capable of reading and within a range of distance in which the proximity storage element 81 is capable of transmitting/receiving. Further, in any of the above cases, in order to carry out reliable reading at the time of reading operations, it is preferable to halt the movement of the printing medium 82.

Configuration of the Roll Paper Unit 30 and the Storage Element 33 Furnished Thereon The roll paper unit 30 is provided with the core material 31, the roll paper for printing 32 that is wound around the outer circumference of the core material 31, and the storage element 33, serving as storage means, that is provided on the inner circumferential surface of the core material 31. It should be noted that on the storage element 33 is stored information about the type of paper indicating whether the medium is plain paper, photo paper, etc., as print control information for determining the number of times of scans for which the print heads perform scanning when image data for one line is to be printed using this roll paper. Other than the information about the type of paper mentioned above, information about the roll paper, such as information about the paper thickness, information about the paper color, information about the paper width, information about the surface quality of the paper, and information about the manufacture data may appropriately be stored on the storage element 33.

The roll paper unit holders 20 and 21 for holding for the roll paper 32 are arranged on both sides of the rear side of the main printer unit 10, forming a pair. One of the roll paper unit holders 20 and 21 (in the case of the first embodiment, the roll paper unit holder 20) is provided with the electrical contact 201 between it and the main printer unit 10, and the transmit/receive section 202, which is electrically connected to the electrical contact 201 and which is for sending and receiving data to and from the storage element 33 of the roll paper unit 30. It should be noted that in order to show the contact 201 and the transmit/receive section 202 that are provided on the roll paper unit holder 20, the roll paper unit holders 20 and 21 are shown detached from the main printer unit 10 and the roll paper unit 30 in FIG. 1.

Positional Relationship Between the Storage Element 33 and the Transmit/Receive Section 202

Figure 7:
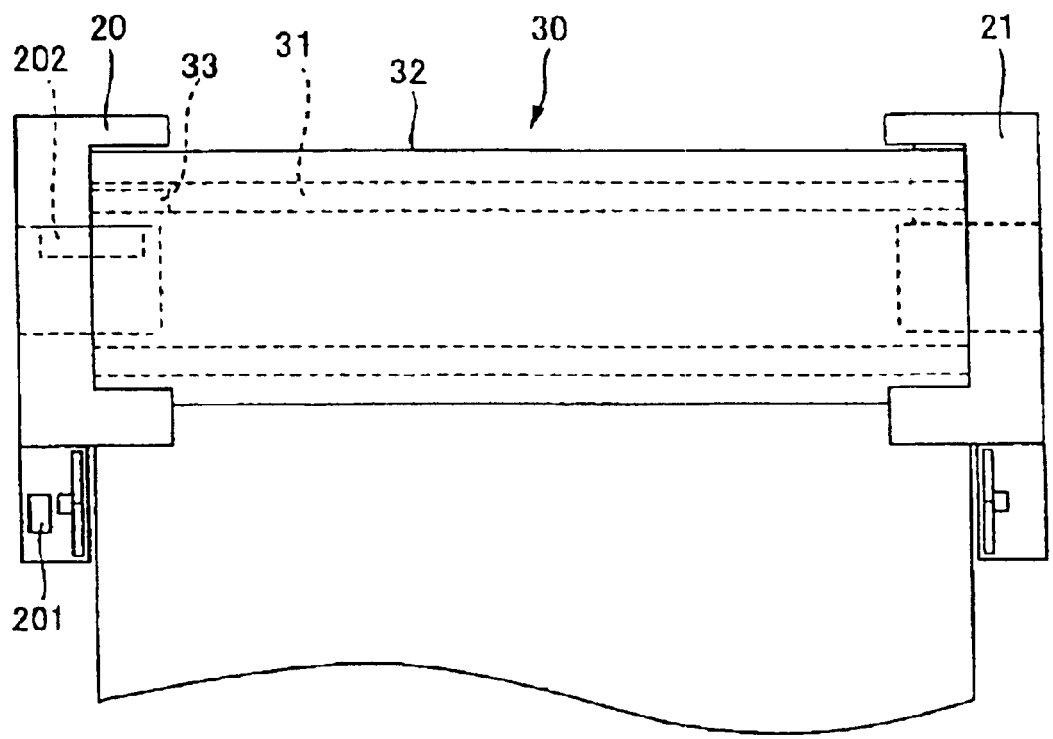
FIG. 7 is an explanatory diagram showing a positional relation between the storage element 33 and the transmit/receive section 202 in a state where the roll paper unit 30 is held by the roll paper unit holders 20,21.
Figure 8:
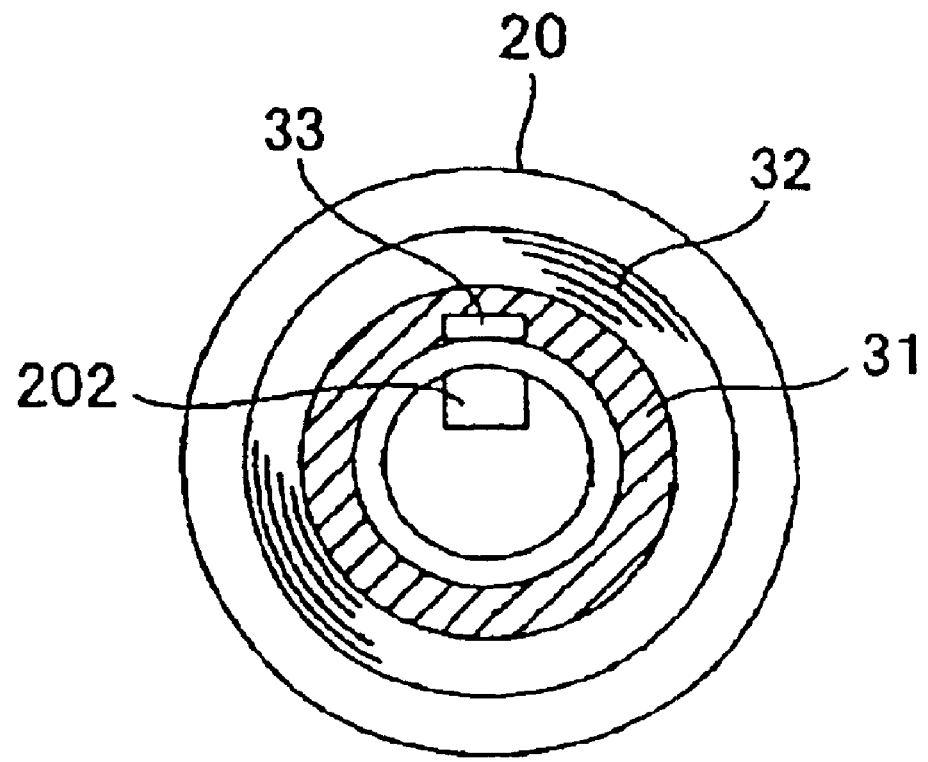
FIG. 8 is a lateral view of FIG. 7 seen from the side of the roll paper unit holder 20.

Next, the positional relationship between the storage element 33 of the roll paper unit 30 and the transmit/receive section 202 of the roll paper unit holder 20 is described with reference to FIG. 7 and FIG. 8. FIG. 7 is a diagram showing the positional relationship between the storage element 33 and the transmit/receive section 202 in a state where the roll paper unlit 30 is held by the roll paper unit holders 20 and 21. FIG. 8 is a lateral view of FIG. 7 seen from the side of the roll paper unit holder 20.

In this embodiment, a noncontact-type storage element is employed as the storage element 33, so that it is not necessary for the storage element 33 and the transmit/receive section 202 to be in contact with one another when data are sent and received. Consequently, as shown in FIG. 7 and FIG. 8, there is a space between the transmit/receive section 202 and the storage element 33. Also, with a noncontact-type storage element, carrier waves that are transmitted from an outside transmit/receive circuit are rectified so as to generate the required power.

Each time the roll paper unit 30 makes one revolution the storage element 33 of the roll paper unit 30 is drawn closest to the transmit/receive section 202 of the roll paper unit holder 20. If a short range-type storage element with which transmission and reception are possible at a distance of about 2 mm is used as the storage element 33, then data can be sent and received when the storage element 33 and the transmit/receive section 202 are nearest to one another. If a midrange-type storage element with which transmission and reception are possible at a distance of about 10 mm is used, then data can be sent and received irrespective of the relative positions of the storage element 32 and the transmit/receive section 202. It should be noted that it is of course also possible to employ a contact-type storage element as the storage element 33. In this case, the roll paper unit holder 20 is provided with a contact in place of the transmit/receive section 202, and data are sent and received when the roll paper unit 30 is rotated and the contact on the side of the roll paper unit holder 20 comes into to contact with the contact of the storage element.

Outline of the Printing Process

Explanation will be made of the printing process upon printing a color image with the color printer 10.

The printing process is preformed using various functions of the CPU in the printer driver of the personal computer PC connected to the color printer 10. The computer PC obtains printing conditions of the color printer 10 in beforehand and stores them on a memory. Here, the printing conditions of the color printer are conditions such as printing resolution, number of nozzles provided on the print head, or the pitch k of the nozzles. The CPU obtains these conditions, converts image data, in accordance with the obtained conditions, into print data in which the data is rearranged in the order that the print head ejects the ink, and supplies the print data to the color printer 10.

That is, when a print instructing signal is input, the personal computer PC performs a predetermined image processing to the image data to be printed, such as resolution conversion, color conversion, or multithresholding, and converts the data into image data for printing with the color printer 10. Here, resolution conversion is a process to convert the resolution of the image into the printing resolution of the printer. Color conversion is a process to convert expressions according to additive color mixture using RGB into expressions according to subtractive color mixture in CMYK. The multithresholding process is a process to convert gray-scale image data into an expression format according to whether dots exist or not.

The image data after having been subjected to image processing is subjected to a rasterizing process and raster-row conversion and then is supplied to the color printer 10 as print data for printing.

A rasterizing process is a process for converting, for each nozzle, data to be printed into data indicating the locations where dots are to be formed by that nozzle. With a rasterizing process, for example, if an image is printed both forward and backward in the main-scanning direction, then the arrangement of the image data is reversed to correspond to the main-scanning direction. Also, if each raster is formed using two nozzles, that is, if so-called overlap recording is performed, then the image data are rearranged so that the data of odd-numbered pixels are supplied to one nozzle and the data of even-numbered pixels are supplied to the other nozzle. At this time, mask data are inserted at even-numbered pixels for the nozzles that form only odd-numbered pixels.

Raster-row conversion is a process for associating the image data that have been rasterized as mentioned above with the number of nozzles that are used in the nozzle rows arranged in the sub-scanning direction, and then writing them to an intermediate buffer in order from the start of the raster data. That is, it is a process for converting raster (scan line) data into row data.

Setting the Interlace Mode According to the Type of Paper

As explained above, the rasterizing process is a process for rearranging the sequence of data so that image data for one line is printed by: printing such that there is an interval between the dots in the main-scanning direction when the print heads IH1 through IH4 perform scanning for the first time; and then, printing in the above-mentioned interval between the dots by repeating an operation of moving the paper in accordance with the printing resolution and then causing the print heads IH1 through IH4 to perform scanning. That is, the interlace mode is set according to the number of times of scans for which the print heads IH1 through IH4 perform scanning and the timing at which the ink is allowed to eject for each scan in order to perform printing of image data for one line.

For example, stored on the computer are a printer driver and a paper-type/control correspondence data table as shown in FIG. 9 by which the types of paper serving as the printing medium, the number of times of scans for which the print heads perform scanning when image data for one line is to be printed, and data indicative of the timing at which the ink is allowed to eject for every scan are associated with each other.

The color printer 10 obtains information about the paper type from the storage elements 81, 33 of the printing medium 82 and the roller paper unit 30, refers to the paper-type/control correspondence data table in the memory, and performs printing according to an interlace mode that suits the printing medium to be printed on.

Printing Operation Using the Color Printer 10

Figure 10:
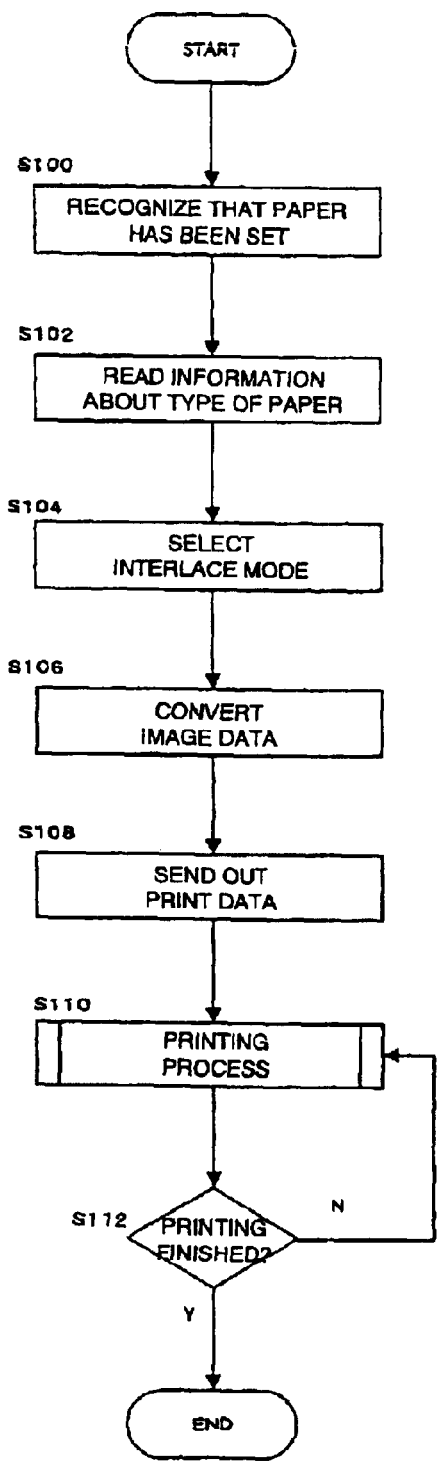
FIG. 10 is a flowchart showing a process that is executed upon printing.

Next, with reference to FIG. 10, the printing operation of the color printer 10 according to the present embodiment will be explained, taking a case where printing is performed on the cardboard 82 comprising the storage element 81. FIG. 10 is a flowchart showing a process that is executed by the control circuit 50 during printing operation of the color printer 10. Here, it is assumed that the reading sensor 80 is provided above the paper supply path in the vicinity of the paper detector 63.

Receiving a print instructing signal to print a high image-quality image, the computer PC to which the color printer 10 is connected receives positional information of the cardboard 82, which serves as the printing medium, from the paper detector 63 of the color printer 10 to recognize that the cardboard 82 has been set to the print-set position by the transporting and positioning means 61, 62 (step S100).

The computer then reads the information about the paper type which is recorded on the storage element 81 of the cardboard 82 (step S102). For example, if information indicating that the paper is of type e (refer to FIG. 9), which means that it easily causes blotting, is stored as the information about the paper type, then, from the paper-type/control correspondence data table explained above, the interlace mode is determined so that the number of times of scans is eight times (step S104), and a rasterizing process is performed according to data indicative of the timing at which the ink is allowed to eject for each scan that is associated to this interlace mode (step S106). The image data after having been subjected to the rasterizing process is then subjected to raster-row conversion in accordance with the number of nozzles provided on the print heads and sent out to the color printer as print data (step S108).

The control circuit 50 of the color printer 10 executes a printing process based on the print data (step S110). The printing process is executed according basically to known process procedures. Upon doing so, the circuit reads out each of the above-mentioned control information stored on the RAM 53 and carries out driving control of the carriage motor 41, the paper feed roller 43, and the print heads IH1 through IH4.

Finally, the control circuit 50 waits until the printing is finished (step S112: No), and after determining that printing has finished (step S112: Yes), it ends the present routine.

As explained above, the printing method of the present embodiment is a printing method in which an image is printed on a cardboard 82 having a storage element 81 by causing print heads, which eject ink, to perform scanning in a predetermined direction. Further, this printing method comprises at least the following steps:

a step of reading out print control information stored on the storage element 81 for determining the number of times of scans for which the print head performs scanning when image data for one line is to be printed; and a step of causing the print head to perform scanning according to the number of times of scans determined based on the above-mentioned print control information that has been read out.

According to the color printer of the present embodiment, since information about the paper type is stored on the storage element 81 provided on the cardboard 82 as the print control information for that cardboard 82, output of high image-quality images is made possible by performing printing according to the interlace mode corresponding to how easily blotting occurs on the cardboard 82 which is just about to be printed on, generating print data suiting the cardboard 82, and performing printing based on such print data. Further, if information in consideration of characteristics due to differences in environment at the time of production of the cardboard 82, differences in production lots, or the like is stored on the storage element 81, it becomes possible to print images with higher image quality by supporting slight differences in characteristics, such as cases where blotting occurs slightly easily or cases where blotting occurs slightly difficultly, even when, for example, the specification etc. of the paper is the same.

Here, explanation was made of an example of a cardboard 82 comprising a storage element 81, but the same effects can be achieved by obtaining the information about the paper type from the storage element 33 of the above-mentioned roll paper unit 30 and printing in accordance with the interlace mode based on this information.

In the present embodiment, an example was given in which information about paper type is stored on the storage elements 81, 33; however, instead, it is possible to, for example, store the number of times of scans for which the print head performs scanning when image data for one line is to be printed. For example, if information about the number of times of scans is stored on the storage element as print control information for printing according to an interlace mode suiting the printing medium on which the storage element is provided, and if a data table, which associates the number of times of scans with data about the timing at which the ink is allowed to eject for each scan, is stored on the memory of the computer that executes the printing process, by obtaining the information about the number of times of scans as the print control information from the above-mentioned storage element, it becomes possible to determine from the data table the timing at which the ink is allowed to eject for each scan. Therefore, it becomes possible to print according to an interlace mode suiting the printing medium which is to be printed on. Further, if data about the timing at which the ink is allowed to eject for each scan is stored on the storage element, based on such data, it becomes possible to print according to an interlace mode suiting the printing medium, and it becomes possible to obtain images of high image quality Further, since blotting is also caused by the characteristics of the ink, by providing a storage element on the ink cartridge and storing information about the characteristics of the ink in this storage element, and by printing according to an optimum interlace mode determined based on the combination of the information about the characteristics of the paper and the information about the characteristics of the ink, it becomes possible to obtain images of even higher image quality.

Note that the printing process explained above is executed according to a code stored on a computer-readable medium, such as a hard disk or a ROM, provided in the computer PC. The computer-readable medium is for causing a printing apparatus, which prints images on a printing medium comprising a memory by making an ink-ejecting print head perform scanning in predetermined directions, to operate. Further, the computer-readable medium comprises the following code: a code for causing the above-mentioned print head to perform scanning according to a number of times of scans determined based on the print control information. Here, the above-mentioned print control information is stored on the above-mentioned memory and is information for determining the number of times of scans for which the print head performs scanning when image data for one line is to be printed.

Modified Examples

Printing of image data having been subjected to a rasterizing process to support an interlace mode can realize images of high image quality. In this case, the print heads perform scanning for a predetermined number of times to print image data for one line. Upon doing so, until the image data for one line has been printed, the paper is fed at pitches according to the printing resolution. Therefore, by printing according to an interlace mode, if the number of times of scans for the print heads IH1 through IH4 is large, the amount for which the paper is fed will become small; therefore, the precision of paper feeding is increased than in cases where printing is not performed according to an interlace mode. A working example making use of this high paper-feeding precision will be explained.

For example, when printing on the whole surface of a paper, that is, in case of so-called borderless printing, ink will be ejected to the edges of the paper. Therefore, there is a possibility that, if there is an error in the paper-feed amount, the ink will adhere to the platen 42 and the ink adhering to the platen 42 will adhere to the back surface of the paper passing above the platen later on. For this reason, paper is fed at high precision by printing according to an interlace mode when printing the front and rear edges of the paper. For example, assume that, as the print control information indicative of how easily blotting occurs, type c is stored on the storage element of the paper. In this case, as shown in the paper-type/control correspondence data table of FIG. 9, it is possible to obtain an image of high image quality by printing according to an interlace mode in which the number of times the print heads perform scanning to print image data for one line is twice; however, by printing with an interlace mode in which the number of times of scans is four times and printing by causing the print heads to perform scanning four times only for image data within predetermined ranges at the front and rear edges, it is possible to feed the paper at high precision and it becomes possible to print without smearing the platen 42.

Further, if high-speed printing is desired, there exists a method for printing without adopting an interlace mode. This is a method in which printing is performed by causing a print head to perform scanning for a first time, and, after moving the paper a distance amounting to the size of the print head, printing is again performed by a second scan. According to this method, spaces and/or lines, called bandings, between the print made by the first scan and the print made by the second scan may become visible. As a method for preventing these bandings, printing is performed according to an interlace mode at the rear end of the print made by the first scan and the front end of the print made by the second scan. According to such printing, it becomes possible to print satisfactory images at high speed.

In the above-mentioned modified examples, it is possible to provide a data table, as a data table for determining an interlace mode, that associates a paper-feeding precision based on the friction coefficient of the paper with the number of times the print heads perform scanning to print in an interlace mode.

Other Embodiments

In the foregoing, some embodiments of a printing apparatus, for example, according to the present invention were described. However, the foregoing embodiment of the present invention is for the purpose of facilitating understanding of the present invention and is not to limit the present invention. The invention can of course be altered and improved without departing from the gist thereof, and it is without saying that the present invention includes functional equivalents thereof.

In the embodiment explained above, explanation was made of an example in which cardboard is used as the main body of the printing medium; however, plastic boards, thin metal sheets, or the like may also be used.

It is possible to realize a printing system comprising the inkjet printer according to the embodiments explained above and a computer connectable to this inkjet printer, and, if necessary, a display device such as a CRT, an input device such as a mouse or a keyboard, a flexible drive device, and a CD-ROM drive device. A printing system realized as above will be a system superior to a conventional system as a whole.

The inkjet printer according to the foregoing embodiment can also be provided with all or some of the functions of a main computer unit, a display device, an input device, a flexible disk drive device, and a CD-ROM drive device. For example, the printer can be configured so as to have an image processing section for carrying out image processing, a display section for carrying out various types of display, and a storage media attach/remove section to/from which storage media storing image data captured by a digital camera or the like can be attached and removed.

Further, in each of the above embodiments, an inkjet printer 10 was used as a printing apparatus. However, the apparatus is not limited to the above as long as it is a printing apparatus that can perform printing processes to single-piece media such as cut paper; for example, the present invention may be applied to single-color printers, laser printers, facsimile machines, or the like.

Further, in each of the above embodiments, a storage element comprising a noncontact IC chip, and a resonant capacitor and a flat antenna coil formed by etching on a metal coating was used as a memory or storage means. However the configuration is not limited to the above; for example, various modifications, such configurations in which the resonant capacitor is connected outside the storage element, or the IC chip and the antenna coil are arranged at separate places and connected together, can be conceived.

Further, the memory or the storage means can be marks such as a barcode, a predetermined dither pattern, or information about color.

According to the present embodiment, it is possible to realize a printing apparatus, a printing medium, a memory, a computer-readable medium, a printing system, and a printing method, which enable printing according to an interlace mode that matches the characteristics of the printing medium set to the printing apparatus.

What is claimed is:

1. A printing apparatus for printing an image on a printing medium, comprising:

a print head capable of performing scanning in a predetermined direction and ejecting ink, the print head ejecting ink onto a printing medium comprising a memory, wherein said memory stores print control information for determining a number of times of scans for which the print head performs scanning when the entire image data for one line is printed with a plurality of number of times of scans of said print head by making the positions, in said predetermined direction, where ink is ejected in each scan different from the positions, in said predetermined direction, where ink is ejected in another scan of the plurality of number of times of scans, and said print head performs scanning according to the number of times of scans that has been determined based on said print control information.

2. A printing apparatus according to claim 1, wherein said printing medium has a storage element as said memory.

3. A printing apparatus according to claim 1, wherein said printing medium has a mark as said memory.

4. A printing apparatus according to claim 1, wherein said print control information is information for identifying a characteristic of said printing medium, and the number of times of scans is determined based on this information.

5. A printing apparatus according to claim 4, wherein said characteristic of said printing medium is the type of paper, and the number of times of scans is determined based on the type of paper.

6. A printing apparatus according to claim 1, wherein said print control information is the number of times of scans for which the print head is scanned when image data for one line is to be printed, and said print head is scanned according to the number of times of scans.

7. A printing apparatus according to claim 1, wherein said print control information is information indicative of a timing at which the print head is allowed to eject ink for each said scan.

8. A printing medium on which an image is printed by a printing apparatus in which a print head capable of ejecting ink scans in a predetermined direction, said printing medium comprising:

a memory capable of storing information, wherein said memory stores print control information for determining a number of times of scans for which the print head performs scanning when the entire image data for one line is printed with a plurality of number of times of scans of said print head by making the positions, in said predetermined direction, where ink is ejected in each scan different from the positions, in said predetermined direction, where ink is ejected in another scan of the plurality of number of times of scans.

9. A printing medium according to claim 8, wherein said printing medium has a storage element as said memory.

10. A printing medium according to claim 8, wherein said printing medium has a mark as said memory.

11. A printing medium according to claim 8, wherein said print control information is information for identifying a characteristic of said printing medium.

12. A printing medium according to claim 11, wherein said information for identifying a characteristic of said printing medium is the type of paper.

13. A printing medium according to claim 8, wherein said print control information is the number of times of scans for which the print head performs scanning when image data for one line is to be printed.

14. A printing medium according to claim 8, wherein said print control information is information indicative of a timing at which the print head is allowed to eject ink for each said scan.

15. A memory provided in or on a printing medium that is used in a printing apparatus in which a print head performs scanning in a predetermined direction to print an image, said memory comprising:

print control information for determining a number of times of scans for which the print head performs scanning to print the entire image data for one line with a plurality of number of times of scans of said print head by making the positions, in said predetermined direction, where ink is elected in each scan different from the positions, in said predetermined direction, where ink is ejected in another scan of the plurality of number of times of scans.

16. A memory according to claim 15, wherein said memory is a storage element.

17. A memory according to claim 15, wherein said print control information is information for identifying a characteristic of said printing medium.

18. A memory according to claim 17, wherein said information for identifying a characteristic of said printing medium is the type of paper.

19. A memory according to claim 15, wherein said print control information is the number of times of scans for which the print head performs scanning to print image data for one line.

20. A memory according to claim 15, wherein said print control information is information indicative of a timing at which the print head is allowed to eject ink for each said scan.

21. A computer-readable medium for causing a printing apparatus to operate, said printing apparatus being capable of printing an image on a printing medium comprising a memory by causing a print head capable of ejecting ink to perform scanning in a predetermined direction, said computer-readable medium comprising the following code:

a code for causing said print head to perform scanning according to a number of times of scans determined based on print control information, wherein said print control information is stored on said memory and is information for determining the number of times of scans for which the print head performs scanning when the entire image data for one line is printed with a plurality of number of times of scans of said print head by making the positions, in said predetermined direction, where ink is ejected in each scan different from the positions, in said predetermined direction, where ink is ejected in another scan of the plurality of number of times of scans.

22. A printing system comprising (a) a computer, and (b) a printing apparatus capable of being connected to the computer and for printing an image on a printing medium, said system comprising:

a print head capable of performing scanning in a predetermined direction and ejecting ink, the print head ejecting ink onto a printing medium comprising a memory, wherein said memory stores print control information for determining a number of times of scans for which the print head performs scanning when the entire image data for one line is printed with a plurality of number of times of scans of said print head by making the positions, in said predetermined direction, where ink is ejected in each scan different from the positions, in said predetermined direction, where ink is ejected in another scan of the plurality of number of times of scans, and said print head performs scanning according to the number of times of scans that has been determined based on said print control information.

23. A printing method for printing an image on a printing medium comprising a memory by causing a print head capable of ejecting ink to perform scanning in a predetermined direction, said method comprising the steps of:

reading out print control information that is stored on said memory and that is for determining a number of times of scans for which the print head performs scanning when the entire image data for one line is printed with a plurality of number of times of scans of said print head by making the positions, in said predetermined direction, where ink is ejected in each scan different from the positions, in said predetermined direction, where ink is ejected in another scan of the plurality of number of times of scans, and causing said print head to perform scanning according to the number of times of scans determined based on said print control information that has been read out.

24. A printing apparatus for printing an image on a printing medium, comprising:

a print head capable of performing scanning in a predetermined direction and ejecting ink, the print head ejecting ink onto a printing medium comprising storage means, wherein said storage means stores print control information for determining a number of times of scans for which the print head performs scanning when the entire image data for one line is printed with a plurality of number of times of scans of said print head by making the positions, in said predetermined direction, where ink is ejected in each scan different from the positions, in said predetermined direction, where ink is ejected in another scan of the plurality of number of times of scans, and said print head performs scanning according to the number of times of scans that has been determined based on said print control information.

* * * * *